United States Patent
Kwon et al.

(12)

(10) Patent No.: US 8,363,591 B2
(45) Date of Patent: Jan. 29, 2013

(54) TRANSMITTER, RECEIVER AND METHOD FOR EXTENDING COVERAGE IN WLAN

(75) Inventors: Hyoung Jin Kwon, Chungcheongbuk-do (KR); Jin Kyeong Kim, Daejeon (KR); Woo Yong Lee, Deajeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 258 days.

(21) Appl. No.: 12/797,401

(22) Filed: Jun. 9, 2010

(65) Prior Publication Data

US 2010/0309838 A1    Dec. 9, 2010

(30) Foreign Application Priority Data

Jun. 9, 2009    (KR) .................. 10-2009-0050881
Apr. 19, 2010   (KR) .................. 10-2010-0035685

(51) Int. Cl.
*H04B 7/14*    (2006.01)
*H04W 40/00*   (2009.01)
(52) U.S. Cl. ...................... 370/315; 370/338
(58) Field of Classification Search ............. 370/315, 370/338
See application file for complete search history.

(56) References Cited

U.S. PATENT DOCUMENTS

| | | | |
|---|---|---|---|
| 6,898,430 B1 * | 5/2005 | Liberti et al. ................. | 455/445 |
| 2004/0177381 A1 | 9/2004 | Kliger et al. | |
| 2006/0217093 A1 * | 9/2006 | Wang et al. .................... | 455/136 |
| 2006/0262758 A1 * | 11/2006 | Sandhu et al. ................ | 370/338 |
| 2008/0075033 A1 * | 3/2008 | Shattil ........................... | 370/328 |
| 2009/0323643 A1 * | 12/2009 | Jeon et al. ..................... | 370/337 |
| 2010/0110968 A1 * | 5/2010 | Lee et al. ...................... | 370/315 |

FOREIGN PATENT DOCUMENTS

KR    2009-0064284 A    6/2009

* cited by examiner

*Primary Examiner* — Brian D Nguyen
(74) *Attorney, Agent, or Firm* — Rabin & Berdo, P.C.

(57) ABSTRACT

A transmitter, a receiver, and a method for extending a coverage in a local area wireless communication network are provided. A group forming unit may form a transmission group together with peripheral devices that enable a local area communication. A distributing unit may distribute, to the peripheral devices, data to be transmitted to a target receiver. A communication unit may transmit the distributed data to the peripheral devices through a frequency band used for the local area communication, and may transmit the distributed data to a reception group, to which the target receiver belongs, using a cooperative Multiple-Input Multiple-Output (MIMO) scheme with the peripheral devices.

19 Claims, 9 Drawing Sheets

TRANSMITTER, RECEIVER AND METHOD FOR EXTENDING COVERAGE IN WLAN

CROSS-REFERENCE TO RELATED APPLICATIONS

This application claims the benefit of Korean Patent Application No. 10-2009-0050881 and of Korean Patent Application No. 10-2010-0035685, respectively filed on Jun. 9, 2009 and Apr. 19, 2010, in the Korean Intellectual Property Office, the disclosures of which are incorporated herein by reference.

BACKGROUND

1. Field of the Invention

The present invention relates to a transmitter, a receiver, and a method for extending a coverage in a local area wireless communication network. More particularly, the present invention relates to a transmitter, a receiver, and a method for extending a coverage in a local area wireless communication network that may enable a wide area communication while data is transmitted at a rate of multiple gigabits per second (Gbps).

2. Description of the Related Art

In a wireless communication network, a 60 gigahertz (GHz) frequency band enables data to be transmitted at a rate of multiple gigabits per second (Gbps). However, since the 60 GHz frequency band has difficulty in passing through internal walls or doors of buildings, and a large attenuation occurs when passing through a human body, data may not be readily transmitted. Accordingly, a communication distance may be reduced depending on an environment. In other words, the 60 GHz frequency band may typically be used for a local area communication within approximately 10 meters (m).

To perform a wide area communication within approximately 100 m, a 5 GHz frequency band may be used. However, the 5 GHz frequency band may transmit data at lower a rate since data is transmitted at a rate of several hundreds of megabits per second (Mbps). Accordingly, there is a desire for technologies to enable a wide area communication while transmitting data at a rate of multi-Gbps.

SUMMARY

An aspect of the present invention provides a transmitter, a receiver, and a method for extending a coverage in a local area wireless communication network that may enable a wide area communication while data is transmitted at a rate of gigabits per second (Gbps).

According to an aspect of the present invention, there is provided a transmitter for extending a coverage in a local area wireless communication network, the transmitter including: a group forming unit to form a transmission group together with peripheral devices, the peripheral devices enabling a local area communication; a distributing unit to distribute data to the peripheral devices, the data being transmitted to a target receiver; and a communication unit to transmit the distributed data to the peripheral devices through a frequency band, and to transmit the distributed data to a reception group, to which the target receiver belongs, using a cooperative Multiple-Input Multiple-Output (MIMO) scheme with the peripheral devices, the frequency band being used for the local area communication.

The peripheral devices and the communication unit may transmit the distributed data to the reception group using the frequency band.

The group forming unit may request the target receiver to form the reception group, and the target receiver may form the reception group together with the neighboring devices that are placed adjacent to the target receiver.

The frequency band may be 60 gigahertz (GHz).

According to another aspect of the present invention, there is provided a transmitter for extending a coverage in a local area wireless communication network, the transmitter including: a distributing unit to distribute data to peripheral devices, the data being transmitted to a target receiver, and the peripheral devices and the transmitter being contained in the same network; and a communication unit to transmit the distributed data to the peripheral devices through a first frequency band, and to transmit the distributed data to a reception group, to which the target receiver belongs, through the first frequency band or a second frequency band, the first frequency band being used for a local area communication, and the second frequency band being used for a wide area communication.

The transmitter may further include a controller to change the first frequency band to the second frequency band and to control the communication unit to transmit the distributed data through the second frequency band, when a data rate is equal to or less than a reference value, the data rate being measured when the distributed data is transmitted to the reception group through the first frequency band.

The transmitter may further include a controller to perform a device discovery, to search for the target receiver, and to request the target receiver to form the reception group together with neighboring devices, the neighboring devices being placed adjacent to the target receiver in a reception network. Here, the target receiver and the neighboring devices may form the reception group.

The first frequency band may be 60 GHz, and the second frequency band may be equal to or lower than 5 GHz.

According to still another aspect of the present invention, there is provided a transmission method for extending a coverage in a local area wireless communication network, the transmission method including: forming a transmission group together with peripheral devices, the peripheral devices enabling a local area communication; distributing data to the peripheral devices, the data being transmitted to a target receiver; transmitting the distributed data to the peripheral devices through a frequency band, the frequency band being used for the local area communication; and transmitting the distributed data to a reception group, to which the target receiver belongs, using a cooperative MIMO scheme with the peripheral devices.

The transmitting of the distributed data to the reception group may include transmitting the distributed data to the reception group using the frequency band.

The transmission method may further include requesting the target receiver to form the reception group, prior to the forming of the transmission group. Here, the target receiver may form the reception group together with the neighboring devices that are placed adjacent to the target receiver.

According to still another aspect of the present invention, there is provided a transmission method for extending a coverage in a local area wireless communication network, the transmission method including: distributing data to peripheral devices, the data being transmitted to a target receiver, the peripheral devices and the transmitter being contained in the same network; transmitting the distributed data to the peripheral devices through a first frequency band, the first frequency band being used for a local area communication; and transmitting the distributed data to a reception group, to which the target receiver belongs, through the first frequency band or a second frequency band, the second frequency band being used for a wide area communication.

The transmitting of the distributed data to the reception group may include changing the first frequency band to the second frequency band and transmitting the distributed data through the second frequency band, when a data rate is equal to or less than a reference value, the data rate being measured when the distributed data is transmitted to the reception group through the first frequency band.

The transmission method may, prior to the distributing of the data, further include performing a device discovery, and searching for the target receiver, and requesting the target receiver to form the reception group together with neighboring devices, the neighboring devices being placed adjacent to the target receiver in the reception group.

According to still another aspect of the present invention, there is provided a receiver for extending a coverage in a local area wireless communication network, the receiver including: a communication unit to receive data from neighboring devices through a frequency band, the neighboring devices being placed adjacent to the receiver, and the frequency band being used for a local area communication; and a decoder to collect the data received from the neighboring devices, and to decode the collected data. Here, each of the neighboring devices may receive the data from transmitters of a transmission group, using a cooperative MIMO scheme.

The neighboring devices may perform a MIMO detection with respect to the received data, may detect corresponding data, and may transmit the detected data to the communication unit.

The receiver may further include a group forming unit to form a reception group together with the neighboring devices in response to a request of a source transmitter, or in response to a request of an access point. Here, the source transmitter may request a data transmission, and the access point may be placed in the transmission group.

EFFECT

According to embodiments of the present invention, it is possible to solve problems that a large attenuation makes it difficult to perform a wide area communication when a 60 GHz band is used, and that a data rate is lowered when a 5 GHz is used. Accordingly, it is possible to distribute, to peripheral devices, data to be transmitted by a source transmitter through the 60 GHz band, and to transmit the data to a reception group using a cooperative Multiple-Input Multiple-Output (MIMO) scheme with the peripheral device through a band that is equal to or lower than 5 GHz. Additionally, the source transmitter may simultaneously transmit the data to the peripheral devices and to the reception group, and a target receiver and neighboring devices placed adjacent to the target receiver may receive the data and thus, it is possible to increase a total throughput in a network by an increased capacity. Therefore, it is possible to extend a coverage by transmitting data at a rate of multiple gigabits per second (Gbps) between different networks.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
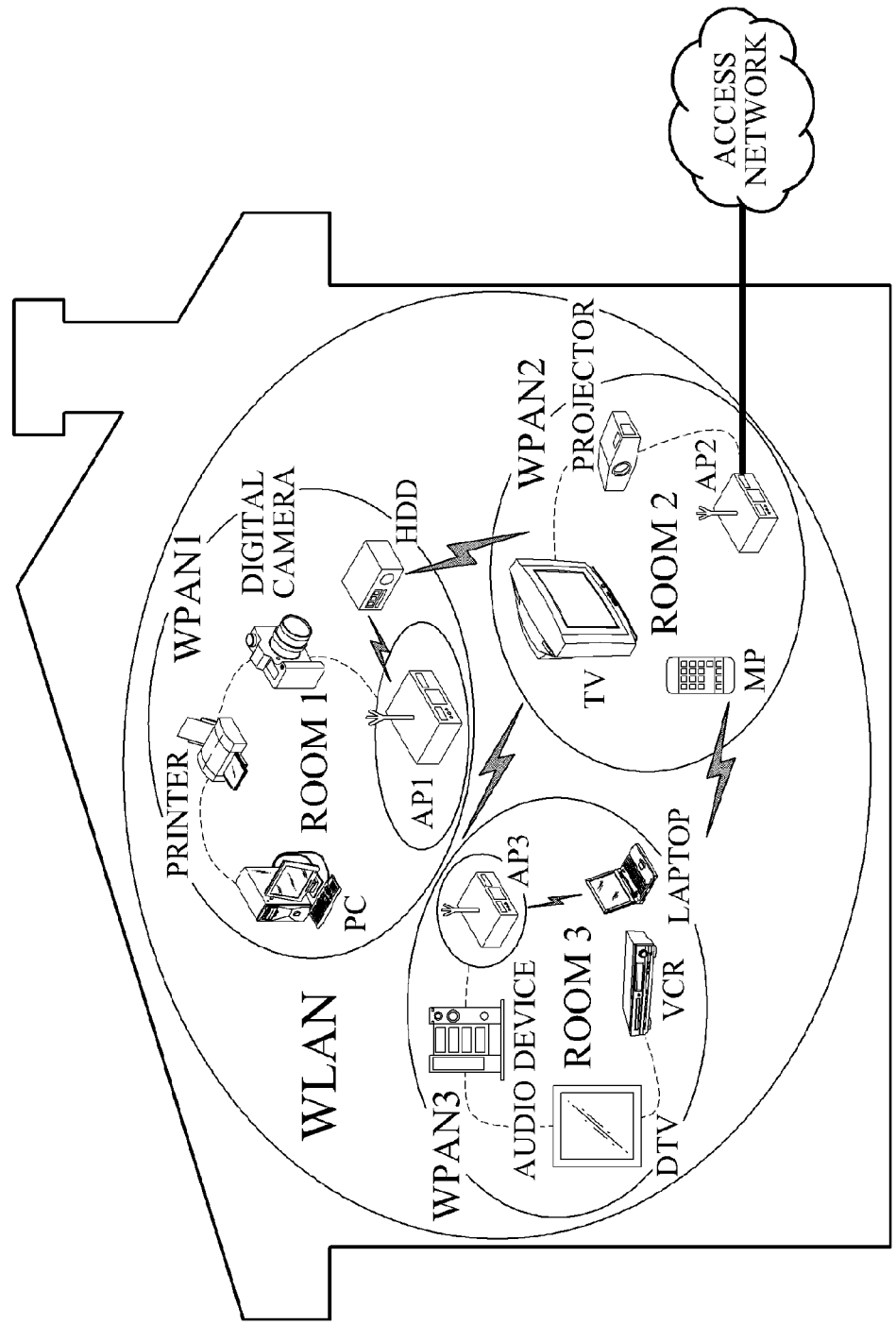
FIGS. 1 through 4 are diagrams illustrating a process for extending a coverage in a local area wireless communication network according to embodiments of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIGS. 1 through 4 are diagrams illustrating a process for extending a coverage in a local area wireless communication network according to embodiments of the present invention.

In the embodiments of the present invention, to realize multi-gigabit wireless home networking, a 60 gigahertz (GHz) frequency band and a frequency band that is equal to or lower than 5 GHz may be used in a hybrid form. For example, a scheme of using the 60 GHz frequency band may include Wireless Personal Area Network (WPAN) schemes, such as Institute of Electrical and Electronics Engineers (IEEE) 802.15.3c, ECMA 387, or IEEE 802 11ad. Additionally, a scheme of using the frequency band that is equal to or lower than 5 GHz may include IEEE 802.11 Wireless Local Area Network (WLAN) using an Industrial, Scientific, and Medical (ISM) band.

In the embodiments of the present invention, a network in a band that is equal to or lower than 5 GHz is referred to as a "WLAN," and a network in a 60 GHz band is referred to as a "WPAN". However, the embodiments are not limited thereto. Additionally, all devices located in the local area wireless communication network may transmit or receive signals in at least one of a 5 GHz band and a 60 GHz band.

As shown in FIG. 1, when a wireless communication network is applied to a home network, WPANs may be formed for each walled area, and a WLAN may cover an overall home network. In FIG. 1, three WPANs may be formed, namely, WPAN1, WPAN2, and WPAN3.

Hereinafter, an example where an external Hard Disk Drive (HDD) in the WPAN1 transmits data to a TV in the WPAN2 will be described. Here, data may be, for example, a video stream transmitted at 3 gigabits per second (Gbps).

Since the TV is outside an available coverage of the WPAN1, the WPAN1 may perform a device discovery through the WLAN. For example, a first access point AP1 of the WPAN1 may perform a device discovery in response to a request of the HDD, to determine which WPAN contains the TV, and to determine whether the TV is currently communicable. Here, the HDD may directly perform the device discovery. When the device discovery is performed, the HDD may identify communicable peripheral devices placed in the WPAN1.

Figure 2:
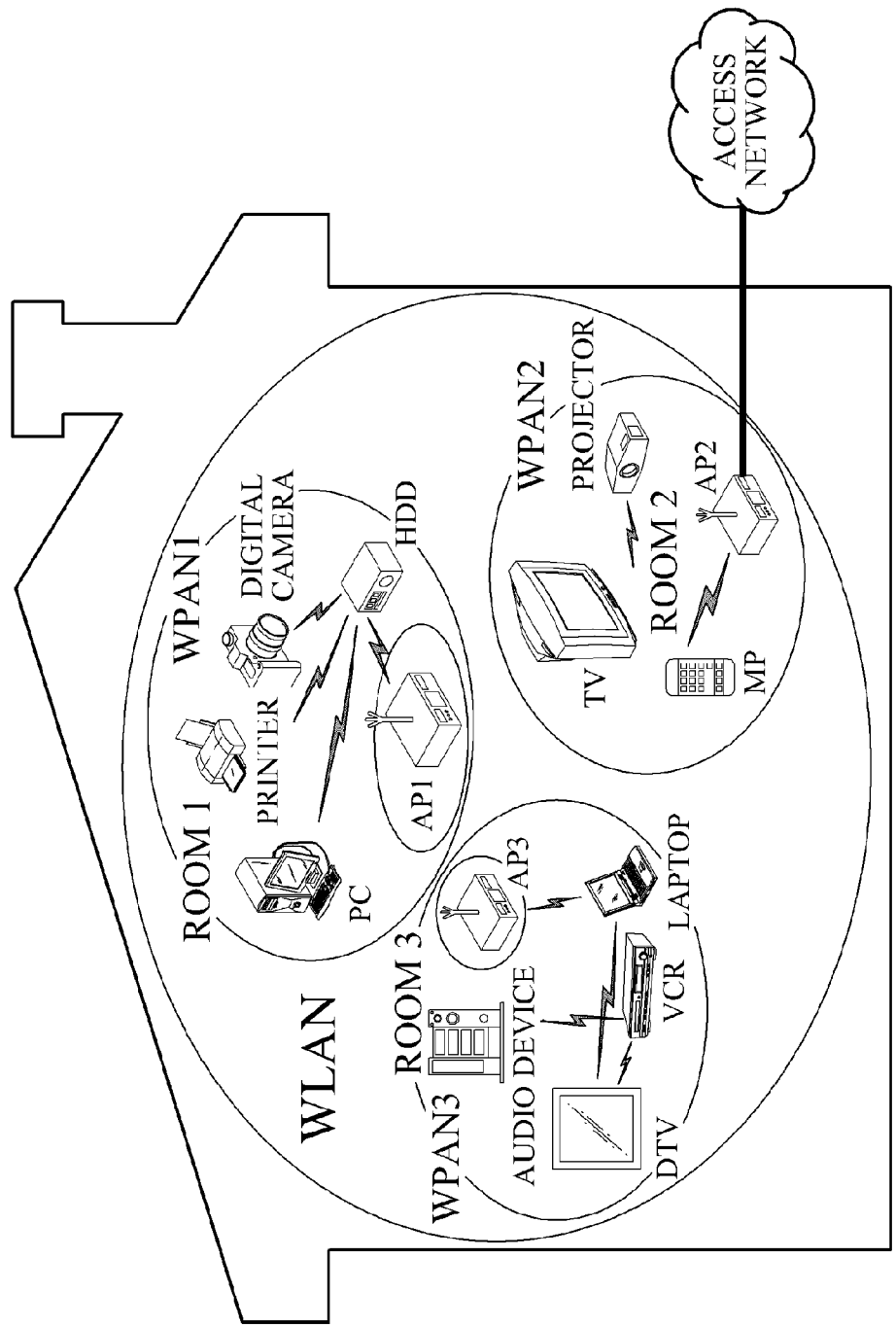

Additionally, as shown in FIG. 2, the HDD may distribute data that is to be transmitted to the TV, to each of the communicable peripheral devices, and may transmit the distributed data to the TV through a first frequency band. This is because an effect of 3 Gbps may be achieved using a plurality of peripheral devices, since it is difficult to perform data streaming at 3 Gbps in the WLAN.

Hereinafter, peripheral devices may include, for example, a printer, a personal computer (PC), a digital camera, and the first access point AP1, and neighboring devices may include, for example, a projector, a mobile phone (MP), and a second access point AP2.

Figure 3:
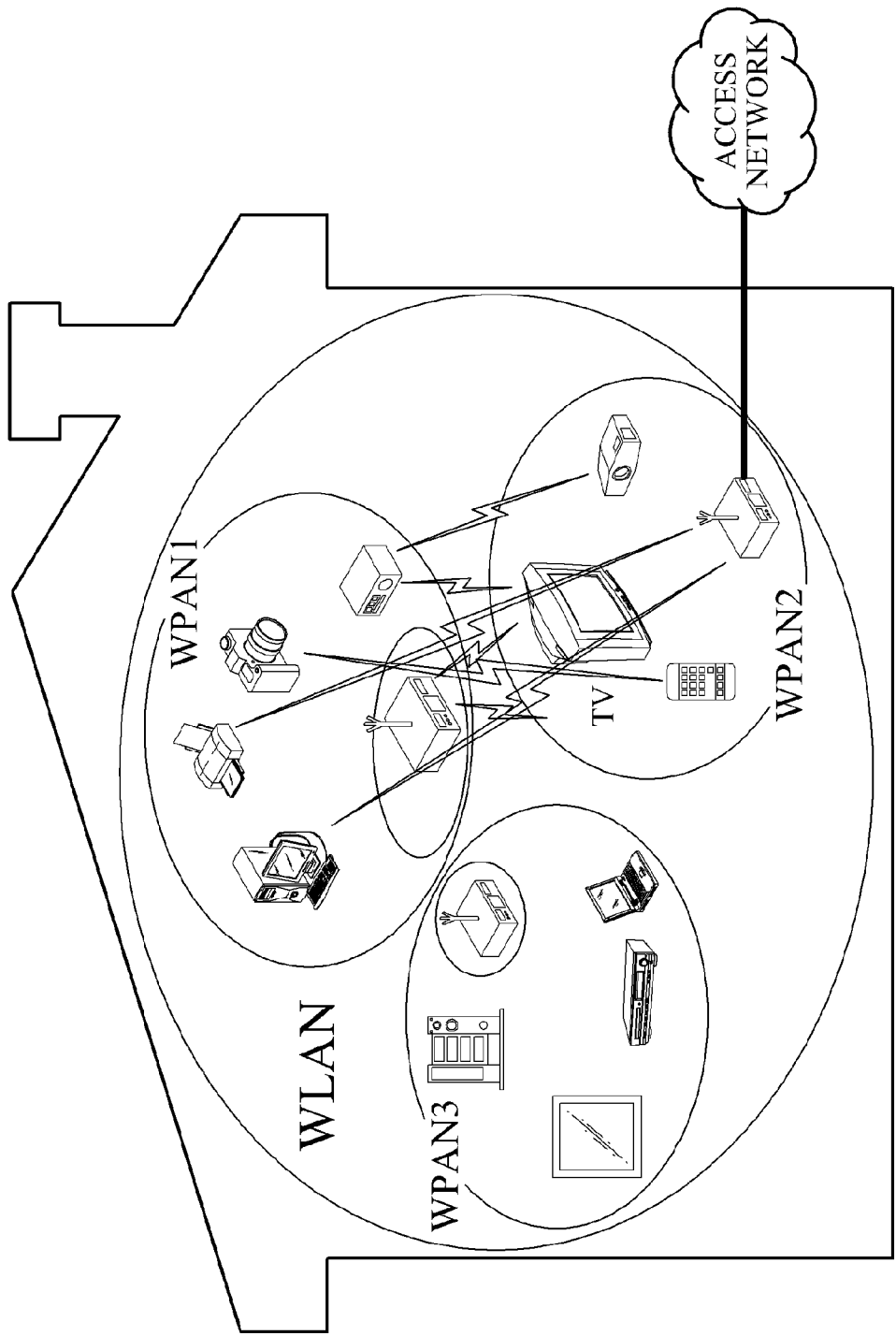

Referring to FIG. 3, the HDD and peripheral devices in the WPAN1 may perform a cooperative Multiple-Input Multiple-Output (MIMO) scheme together with the TV and neighboring devices placed adjacent to the TV in the WPAN2. The cooperative MIMO scheme may be performed through a first frequency band and a second frequency band. Here, the first frequency band may be used for a local area communication, and the second frequency band may be used for a wide area communication. Additionally, the first frequency band may be 60 GHz, and the second frequency band may be equal to or lower than 5 GHz.

Here, the distributed data transmitted from the WPAN1 may be transmitted at different locations, and may pass through a wall, and thus, data transmission environment may correspond to a rich scattering environment. When data is transmitted from the WPAN1, effects of the cooperative MIMO scheme may be exhibited, and spatial multiplexing may also be used.

Additionally, in a communication between the transmission group in the WPAN1 and the reception group in the WPAN2, an access point (not shown) of the WLAN may perform broadcasting, or may perform a Request to Send/Clear to Send (RTS/CTS) operation, and thus, only devices belonging to at least one of the transmission group and the reception group may participate in data transmission and reception.

As shown in FIG. 3, the cooperative MIMO scheme may enable the HDD and peripheral devices in the WPAN1 to transmit data to the TV and neighboring devices in the WPAN2, and may enable the TV and neighboring devices to perform a MIMO detection.

The MIMO detection may be performed by two schemes. Specifically, the two schemes may be classified into a closed loop MIMO scheme and an open loop MIMO scheme, depending on whether it is possible to notify transmitters of channel state information of each link as feedback information.

In the closed loop MIMO scheme, to reflect the feedback information, each transmitter may perform a phase shift in advance using a precoding scheme, and may then transmit data. Each receiver may use only the received data to decode a same number of streams as a maximum number of antennas included in each receiver. In other words, each receiver may decode the same number of streams as the maximum number of antennas, without using stream information received by other receivers. Additionally, each receiver may transmit the decoded streams to a final target receiver.

When there is a need to use the open loop MIMO scheme due to an overhead that needs to provide the channel state information of each link as feedback information, or other reasons, each receiver may exchange information detected at each receiving end (for example a hard decision value, and a soft decision value) via a radio connection. Here, when each receiver transmits the soft decision value without any change, a data rate may be increased, and accordingly, the detected information may be quantized and transmitted. Additionally, each receiver may apply an iteration to increase a MIMO detection performance. Here, each receiver may coarsely or finely change a quantization level, based on a type of used algorithm, and may transmit the detected information.

As described above, each receiver may perform a centralized MIMO detection to move received streams to a single receiver, or may perform a distributed MIMO detection simultaneously with respect to a plurality of receivers. Additionally, each receiver may transmit streams acquired by the MIMO detection to a target receiver, so that the target receiver may decode multiple streams.

For example, when a part of the multiple streams is not decoded by the target receiver, the target receiver may notify a transmitter of information regarding streams that fail to be decoded. The transmitter may adaptively perform a cooperative MIMO transmission scheme up to a capacity of data that can be transferred through a channel in next transmission.

Figure 4:
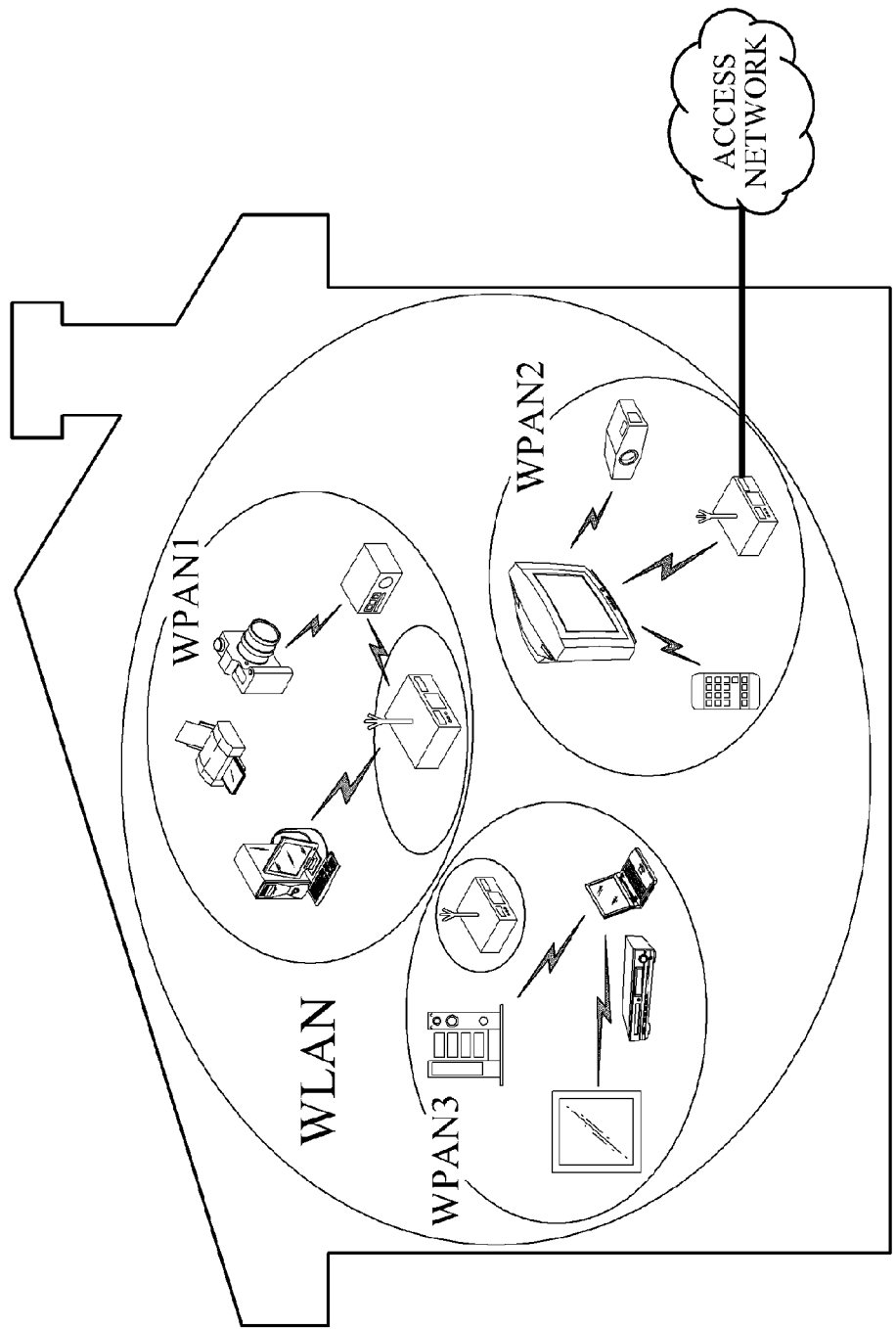

Referring to FIG. 4, the neighboring devices may transfer, to the TV, data detected by the MIMO detection through the 60 GHz band. The TV may collect data detected by the TV and the data received from the neighboring devices, and may decode the collected data. The decoded data may be provided in a form suitable for display on the TV.

As described above, to transmit data to a target receiver, namely the TV, in the WPAN2, a source transmitter, namely the HDD, in the WPAN1 may distribute the data to the peripheral devices in the WPAN1. The source transmitter and the peripheral devices may transmit the distributed data to each reception group, and may perform the cooperative MIMO scheme. Thus, it is possible to extend the coverage in the local area wireless communication network.

Additionally, since the WPAN1 and the WPAN2 are out of the available coverage, any interference may not occur therebetween. Accordingly, the WPAN1 may use a spatial reuse scheme, and may communicate with the WPAN3 in the home network. According to the embodiments of the present invention, a control signal, for example an ACK signal, or a beacon may be transmitted by a point-to-point or an access point of a transceiver, for example an HDD and a TV, due to its low data rate, rather than using the cooperative MIMO scheme. As a result, it is possible to reduce latency. For example, the ACK signal may be used to notify an HDD that a TV of a reception group successfully receives data.

Figure 5:
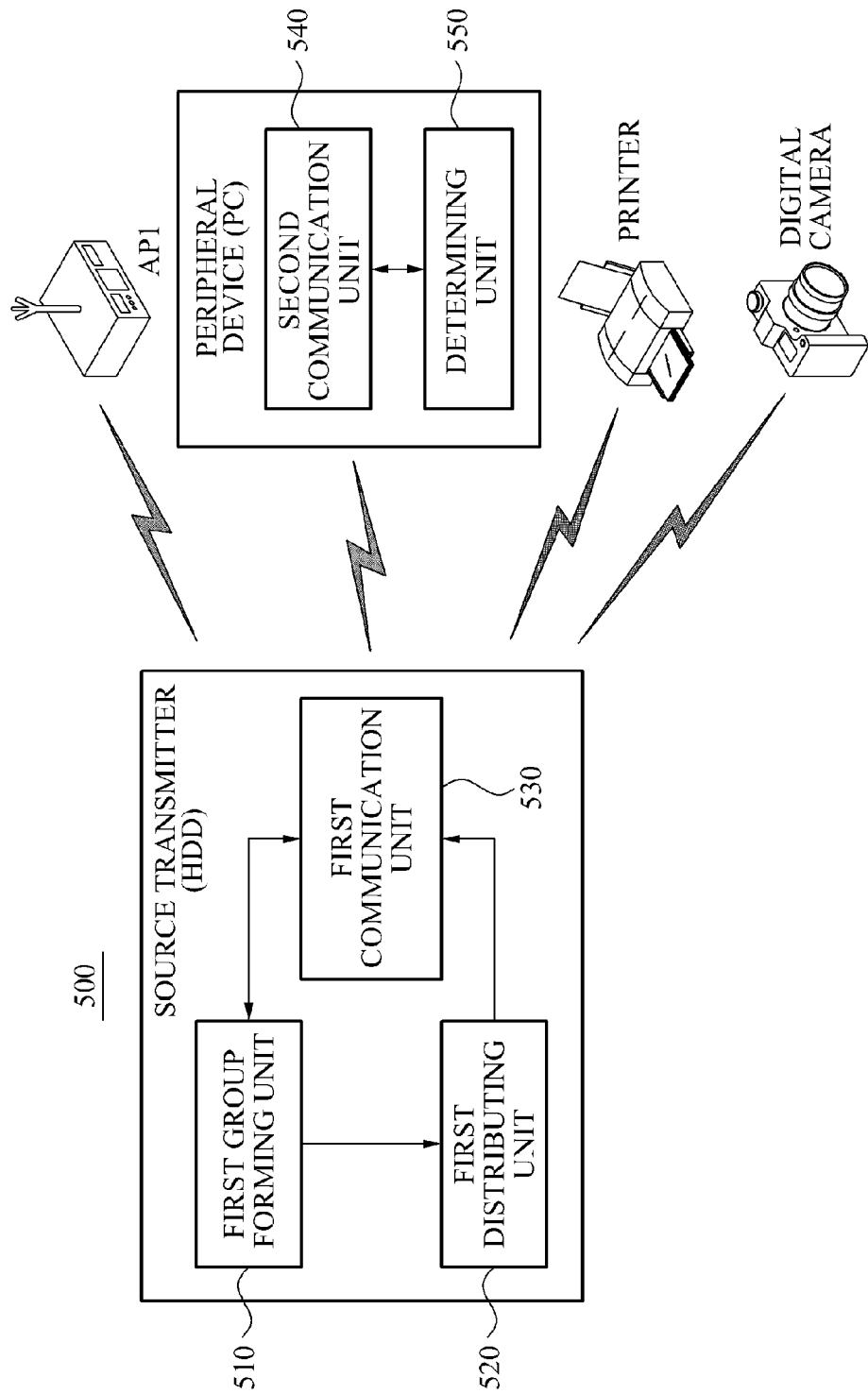
FIG. 5 is a block diagram illustrating a transmitter for extending a coverage in a local area wireless communication network according to a first embodiment of the present invention.

FIG. 5 is a block diagram illustrating a transmitter 500 for extending a coverage in a local area wireless communication network according to a first embodiment of the present invention.

Referring to FIG. 5, the transmitter 500 may include a first group forming unit 510, a first distributing unit 520, and a first communication unit 530. The transmitter 500 may be a source transmitter to transmit data to a target receiver 600 located in another network. All devices located in the WPAN1 of FIG. 1 may function as transmitters or receivers, and the HDD will be used hereinafter as the transmitter 500. Additionally, the target receiver 600 may be placed in networks other than the WPAN1, and the TV of the WPAN2 will be used hereinafter as the target receiver 600.

The first group forming unit 510 may perform a device discovery, and may determine whether the target receiver 600 is communicable. For example, to determine whether the target receiver 600 is communicable, the first group forming unit 510 may inquire of the first access point AP1 of the WPAN1 about whether the target receiver 600 is communicable, and the first access point AP1 may inquire of the second access point AP2 of the WPAN2 about whether the target receiver 600 is communicable.

When the target receiver 600 is available, that is, is communicable, the first group forming unit 510 may form a transmission group together with peripheral devices that enable a local area communication. The peripheral devices may be communicable devices among the devices located in the WPAN1. In other words, the transmission group may contain all or a part of the devices located in the WPAN1.

Additionally, when the target receiver 600 is determined to be communicable, the first group forming unit 510 may request the target receiver 600 to form a reception group. The target receiver 600 may form the reception group together with neighboring devices that are placed adjacent to the target receiver 600 in a network where the target receiver 600 is located. Specifically, the target receiver 600 may form a reception group, together with neighboring devices that are currently communicable among the devices located in the WPAN2, and may transmit the formed reception group to the transmitter 500.

When the transmission group and the reception group are formed, the first group forming unit 510 may provide the first distributing unit 520 with a list of the peripheral devices contained in the transmission group.

The first distributing unit 520 may distribute, to the peripheral devices, data to be transmitted to the target receiver 600. Specifically, the first distributing unit 520 may distribute the data to the peripheral devices, based on the list received from the first group forming unit 510.

The first communication unit 530 may perform a local area communication with the peripheral devices located in the same network, for example the WPAN1. The first communication unit 530 may inquire of the peripheral devices located in the WPAN1 about whether the peripheral devices are communicable, and may provide the first group forming unit 510 with a list of communication peripheral devices.

Additionally, the first communication unit 530 may transmit the distributed data to the communicable peripheral devices through a frequency band used for the local area communication. The first communication unit 530 may perform the local area communication using the frequency band for the local area communication. Here, the frequency band used for the local area communication may be 60 GHz.

Furthermore, the first communication unit 530 may perform a local area communication or a wide area communication with an external network, for example the WPAN2. In particular, the first communication unit 530 may transmit the distributed data to the reception group, to which the target receiver 600 belongs, using the cooperative MIMO scheme with the peripheral devices. The first communication unit 530 may also use the frequency band for the local area communication to transmit the distributed data to the reception group.

As shown in FIG. 5, a peripheral device of the transmitter 500 may include a second communication unit 540, and a determining unit 550, and may be implemented as a PC for convenience of description. For example, when a message inquiring about whether the peripheral device is communicable is received from the transmitter 500, the second communication unit 540 may transmit the received message to the determining unit 550.

The determining unit 550 may check a current communication performance of the PC, and may determine whether the PC is communicable. The second communication unit 540 may transmit a result of the determining by the determining unit 550 to the transmitter 500.

Figure 6:
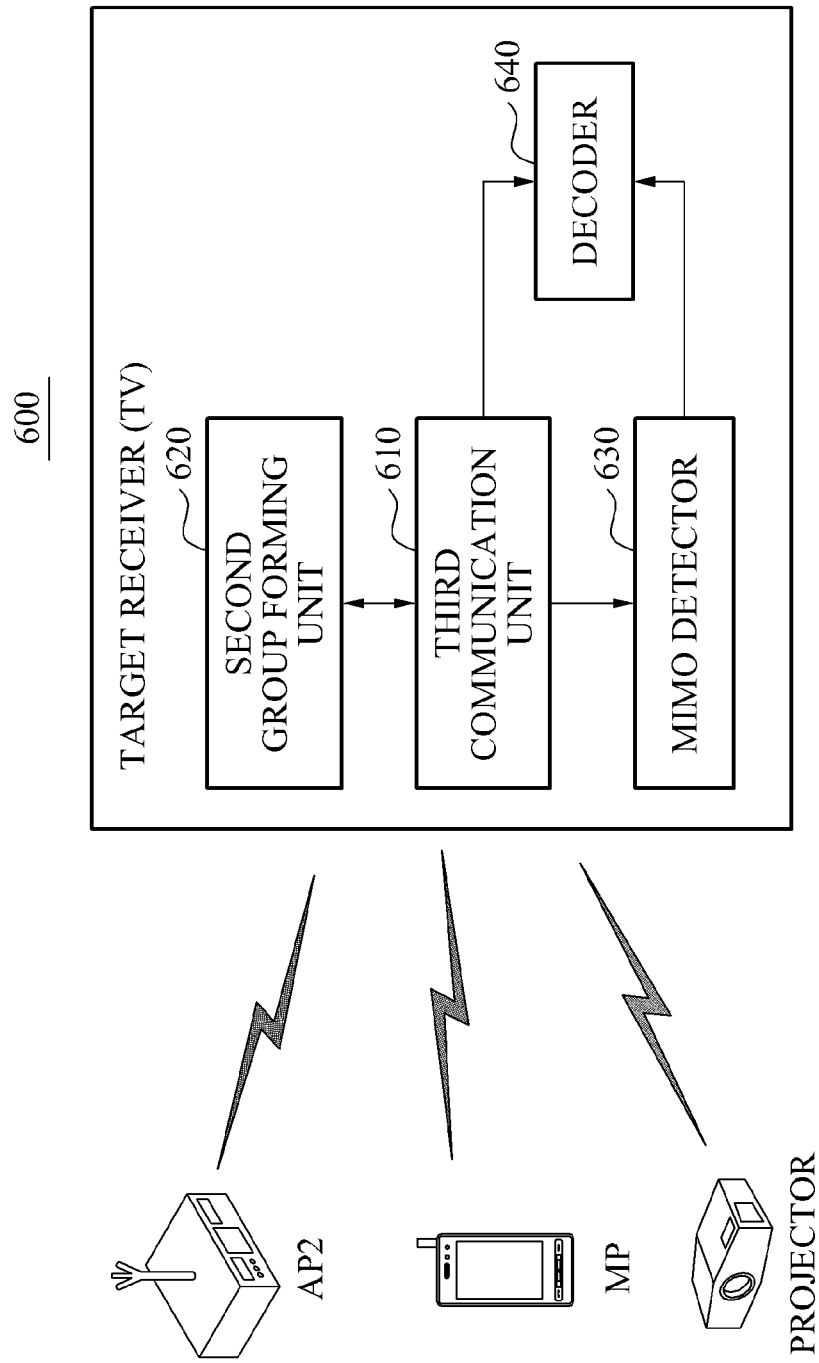
FIG. 6 is a block diagram illustrating a receiver for extending a coverage in a local area wireless communication network according to the first embodiment of the present invention.

FIG. 6 is a block diagram illustrating the target receiver 600 for extending a coverage in a local area wireless communication network according to the first embodiment of the present invention.

Referring to FIG. 6, the neighboring devices contained in the reception group may receive data from the transmitter 500 and peripheral devices in the WPAN1, using the cooperative MIMO scheme. The neighboring devices may perform a MIMO detection with respect to the received data, and may detect data that they need to receive. Additionally, the neighboring devices may transmit the detected data to the target receiver 600.

The target receiver 600 may include a third communication unit 610, a second group forming unit 620, a MIMO detector 630, and a decoder 640. The third communication unit 610 may recognize in advance that data may be transmitted from the transmitter 500 through the device discovery performed by the transmitter 500. The third communication unit 610 may receive the data detected by the neighboring devices adjacent to the target receiver 600 through the frequency band used for the local area communication. Here, the frequency band used for the local area communication may be 60 GHz.

The second group forming unit 620 may form the reception group together with the neighboring devices, in response to a request of the first access point AP1 or a request of the transmitter 500 in the transmission group. The third communication unit 610 may notify the target receiver 600 and the neighboring devices that the reception group is formed, and that communication may be performed using the cooperative MIMO scheme.

The MIMO detector 630 may detect data that the target receiver 600 actually needs to receive, among the data received by the third communication unit 610 using the cooperative MIMO scheme.

The decoder 640 may collect the data detected by the MIMO detector 630 and the data received from the neighboring devices, and may decode the collected data, so that the decoded data may be displayed on the TV, namely, the target receiver 600.

Figure 7:
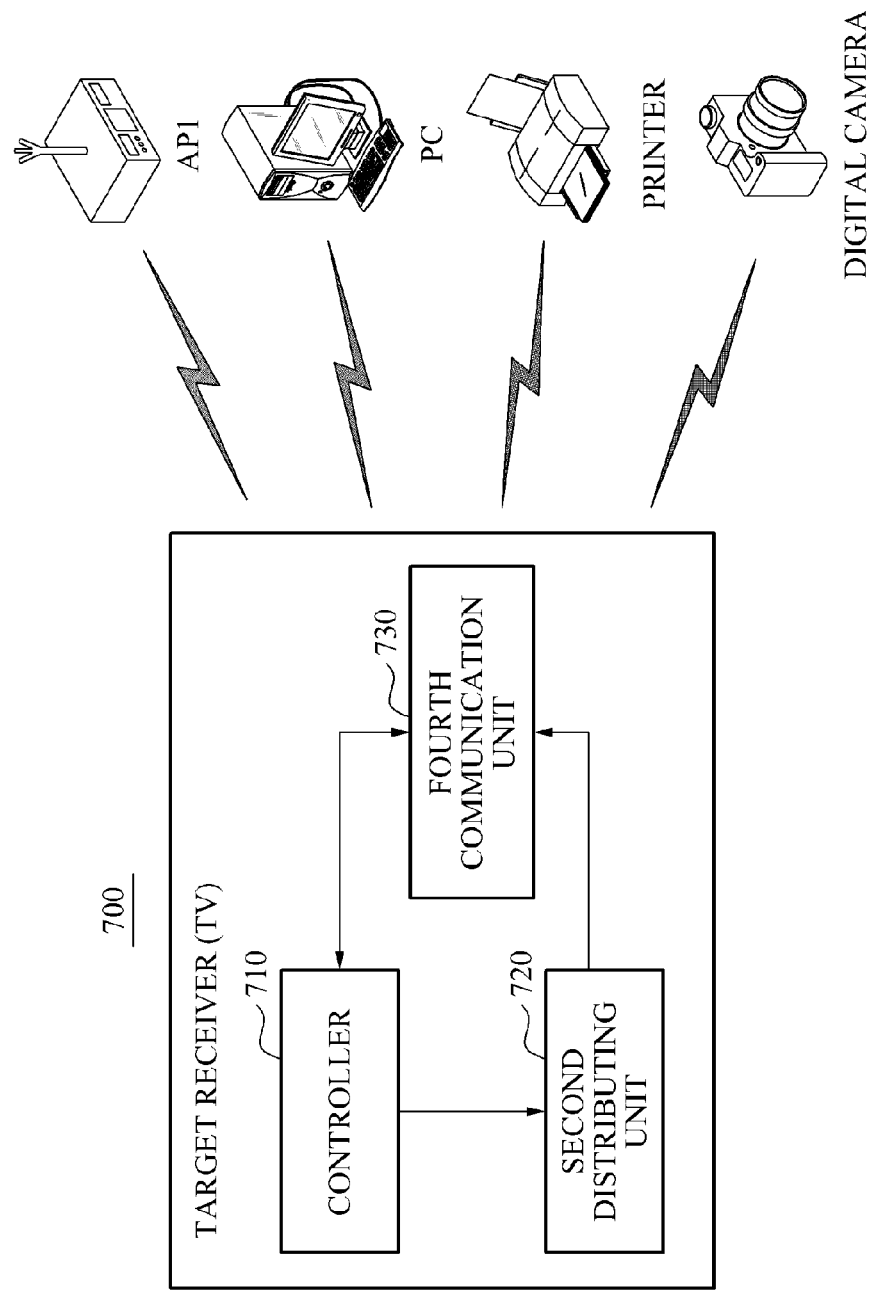
FIG. 7 is a block diagram illustrating a transmitter for extending a coverage in a local area wireless communication network according to a second embodiment of the present invention.

FIG. 7 is a block diagram illustrating a transmitter 700 for extending a coverage in a local area wireless communication network according to a second embodiment of the present invention.

The transmitter 700 of FIG. 7 may be a source transmitter to transmit data to a target receiver located in another network. The target receiver may be placed in networks other than a network to which the transmitter 700 belongs, and may receive data from the transmitter 700. Hereinafter, the transmitter 700 and the target receiver will be respectively implemented, for example, as the HDD in the WPAN1, and the TV in the WPAN2.

Referring to FIG. 7, the transmitter 700 may include a controller 710, a second distributing unit 720, and a fourth communication unit 730.

The controller 710 may perform a device discovery to search for the target receiver, namely, the TV. When the TV is found and determined to be communicable through the device discovery, the controller 710 may determine peripheral devices and neighboring devices that are to participate in the cooperative MIMO scheme.

For example, the controller 710 may determine devices located in the same network as the transmitter 700 to be peripheral devices that are to participate in the cooperative MIMO scheme. Specifically, when the device discovery is performed, the first access point AP1 may broadcast devices that are to participate in the cooperative MIMO scheme, in response to a request of the controller 710, and may enable the broadcasted devices to be on standby. Alternatively, the first access point AP1 may perform the RTS/CTS operation with all of the devices contained in the WLAN, and may recognize the devices that are to participate in the cooperative MIMO scheme. Accordingly, devices belonging to neither the WPAN1 nor the WPAN2 may not participate in data transmission and reception.

The transmitter 700 and the peripheral devices that are to participate in the cooperative MIMO scheme may be contained in the transmission group. Additionally, the TV and the neighboring devices may be contained in the reception group.

When the peripheral devices and neighboring devices for the cooperative MIMO scheme are determined, the second distributing unit 720 may distribute data that is to be transmitted to the TV, to the peripheral devices.

The fourth communication unit 730 may perform the local area communication with peripheral devices located in the same network, for example the WPAN1. Accordingly, the fourth communication unit 730 may transmit the distributed data to the peripheral devices through the first frequency band.

Additionally, the fourth communication unit 730 may transmit the distributed data to the reception group, to which the TV belongs, through the first frequency band or through the second frequency band for the wide area communication, using the cooperative MIMO scheme. Here, the reception group may be located in the network where the TV is located, and may include the devices that participate in the cooperative MIMO scheme.

The first frequency band may be used to perform a local area communication, and may be, for example, a 60 GHz band enabling data transmission at a rate of multiple Gbps. The second frequency band may be used to perform a wide area communication, and may be equal to or lower than 5 GHz where data may be transmitted within approximately 100 meters (m).

Specifically, the controller 710 may compare a data rate with a reference value that is set in advance, and may determine whether to use the second frequency band depending on a result of the comparing. Here, the data rate may be measured when the distributed data is transmitted to the reception group through the first frequency band. For example, when the data rate is equal to or less than the reference value, the controller 710 may determine that it is impossible to transmit data at a desired data rate due to a large attenuation, and may control the fourth communication unit 730 and the peripheral devices to transmit the distributed data to the reception group through the second frequency band.

Operations of the peripheral devices have been described above with reference to FIG. 6, and accordingly, further description will be omitted herein.

Additionally, according to the second embodiment, the TV and the neighboring devices may receive data from the transmission group using the cooperative MIMO scheme. Here, the second frequency band may be used by the TV and the neighboring devices to receive the data. Thus, it is possible to minimize attenuation caused by data transmission.

Furthermore, the neighboring devices may perform the MIMO detection with respect to the data received through the second frequency band, may detect corresponding data, and may transmit the detected data to the TV. Here, the first frequency band may be used by the neighboring devices to transmit the detected data to the TV. The TV may collect received data, and may decode the collected data.

Figure 8:
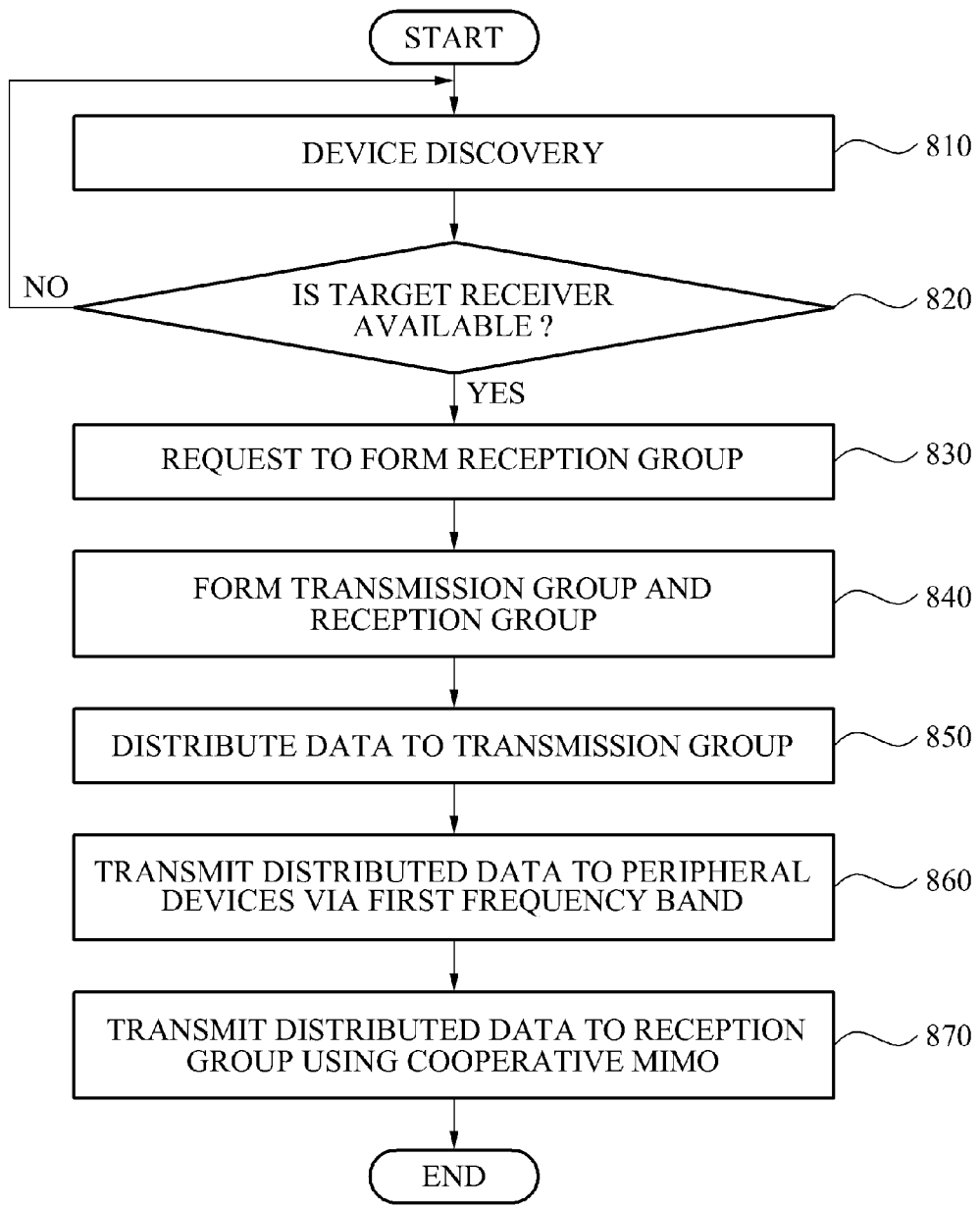
FIG. 8 is a flowchart illustrating a transmission method for extending a coverage in a local area wireless communication network according to the first embodiment of the present invention.

FIG. 8 is a flowchart illustrating a transmission method for extending a coverage in a local area wireless communication network according to the first embodiment of the present invention.

Referring to FIGS. 5 and 8, in operation 810, the first group forming unit 510 of the transmitter 500 that is to transmit data may perform the device discovery, and may determine whether the TV is available, that is, is communicable.

When the TV is determined to be available in operation 820, the first group forming unit 510 may request the TV to form a reception group in operation 830.

In operation 840, the first group forming unit 510 may form a transmission group together with peripheral devices that enable a local area communication, and the TV may form the reception group together with neighboring devices. Here, the neighboring devices may be placed adjacent to the TV in a network where the TV is located.

The transmission group may include the transmitter 500 and the peripheral devices, and may be placed in the same network as the transmitter 500. The reception group may include the TV and the neighboring devices, and may be placed in the same network as the TV.

In operation 850, the first group forming unit 510 may provide the first distributing unit 520 with a list of the peripheral devices, and the first distributing unit 520 may distribute, to the peripheral devices, data to be transmitted to the TV.

In operation 860, the first communication unit 530 may transmit the distributed data to the peripheral devices contained in the transmission group through a frequency band. Here, the frequency band may be used for the local area communication, and may be 60 GHz.

In operation 870, the first communication unit 530 may transmit the distributed data to the reception group, to which the TV belongs, using the cooperative MIMO scheme with the peripheral devices. The first communication unit 530 may also use the frequency band for the local area communication to transmit the distributed data to the reception group.

When the reception group receives the data using the cooperative MIMO scheme through the frequency band used for the local area communication, the TV and the neighboring devices in the reception group may perform the MIMO detection with respect to the received data, and may detect corresponding data. The neighboring devices may transfer the data detected by the MIMO detection to the TV through the same frequency band. The TV may collect the data received from the neighboring devices and the data detected by the TV, and may decode the collected data. The decoded data may be stored or provided to a user, or may be transmitted to another device, depending on characteristics of the TV.

Figure 9:
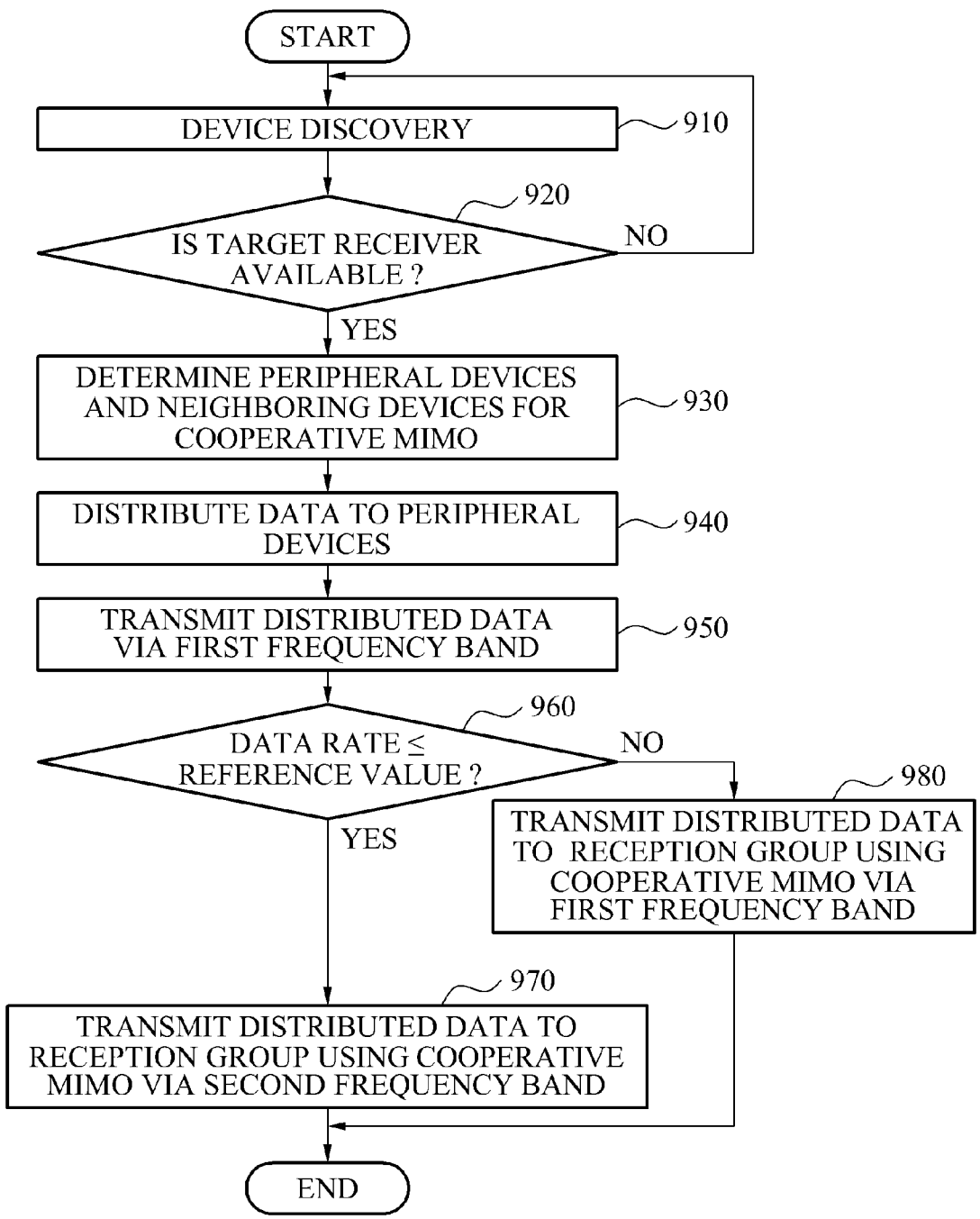
FIG. 9 is a flowchart illustrating a transmission method for extending a coverage in a local area wireless communication network according to the second embodiment of the present invention.

FIG. 9 is a flowchart illustrating a transmission method for extending a coverage in a local area wireless communication network according to the second embodiment of the present invention.

In operation 910, the controller 710 of the transmitter 700 may perform the device discovery, and may determine whether the TV is available, that is, is communicable.

When the TV is determined to be available in operation 920, the controller 710 may determine peripheral devices and neighboring devices that are to participate in the cooperative MIMO scheme in operation 930.

In operation 940, the second distributing unit 720 may distribute data that is to be transmitted to the TV, to the peripheral devices.

In operation 950, the fourth communication unit 730 may transmit the distributed data to the peripheral devices through the first frequency band. Here, the first frequency band may be used to perform a local area communication, and may be 60 GHz.

In operation 960, the controller 710 may compare a data rate with a reference value that is set in advance. Here, the data rate may be measured when the distributed data is transmitted to the reception group through the first frequency band.

In operation 970, when the data rate is equal to or less than the reference value, the controller 710 may control the fourth communication unit 730 and the peripheral devices to transmit the distributed data to the reception group through the second frequency band.

Conversely, in operation 980, when the data rate is greater than the reference value, the controller 710 may control the fourth communication unit 730 and the peripheral devices to transmit the distributed data to the reception group through the first frequency band. Here, the data rate greater than the reference value may indicate that it is possible to transmit data at a desired data rate since attenuation is relatively small.

As described above, the embodiments of the present invention may provide advantages where data may be transmitted at multiple Gbps using a 60 GHz band, and that a coverage may be extended up to 100 m with respect to the same transmission power of a WLAN using a band within 5 GHz. Thus, it is possible to extend the coverage of a system based on the 60 GHz band, and to improve a throughput of a system based on the band within 5 GHz, compared with a system using only a single band.

Additionally, according to the embodiments of the present invention, it is possible to form a group including neighboring devices within a network, even when a throughput of a point-to-point communication is reduced due to an environment having a large attenuation of power, for example a 60 GHz band, and to a high density of devices in the network. In addition, it is possible to increase a reception signal-to-noise ratio (SNR) by reducing an interference through a cooperative MIMO scheme between groups, and by increasing a reception power.

The above-described exemplary embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed, or they may be of the kind well-known and available to those having skill in the computer software arts.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A transmitter for extending coverage of a local area wireless communication network, comprising:
    a group forming unit configured to form a transmission group together with a plurality of peripheral devices, the peripheral devices enabling a local area communication;
    a distributing unit configured to distribute data to the plurality of peripheral devices for transmission to a target receiver; and
    a communication unit configured to transmit the distributed data to the plurality of peripheral devices through a frequency band, to cause each of the plurality of peripheral devices to receive a portion of the distributed data and to transmit the received portion of the distributed data to a reception group, to which the target receiver belongs, and to transmit the distributed data to the reception group, using a cooperative Multiple-Input Multiple-Output (MIMO) scheme with the peripheral devices, the frequency band being used for the local area communication.

2. The transmitter of claim 1, wherein the peripheral devices and the communication unit transmit the distributed data to the reception group using the frequency band.

3. The transmitter of claim 1, wherein the group forming unit requests the target receiver to form the reception group, and the target receiver and neighboring devices thereof form the reception group, the neighboring devices being placed adjacent to the target receiver.

4. The transmitter of claim 1, wherein the frequency band is 60 gigahertz (GHz).

5. A transmitter for extending coverage of a local area wireless communication network, the transmitter comprising:
    a distributing unit configured to distribute data to a plurality of peripheral devices for transmission to a target receiver, the plurality of peripheral devices and the transmitter being in a same sub-network of the local area wireless communication network; and
    a communication unit configured to transmit the distributed data to the plurality of peripheral devices through a first frequency band, to cause each of the plurality of peripheral devices to receive a portion of the distributed data and to transmit the received portion of distributed data to a reception group, to which the target receiver belongs, through a second frequency band, and to transmit the distributed data to the reception group through the first frequency band or the second frequency band, the first frequency band being used for a local area communication, and the second frequency band being used for a wide area communication.

6. The transmitter of claim 5, further comprising:
    a controller to change the first frequency band to the second frequency band and to control the communication unit to transmit the distributed data through the second frequency band, when a data rate is equal to or less than a reference value, the data rate being measured when the distributed data is transmitted to the reception group through the first frequency band.

7. The transmitter of claim 5, further comprising:
    a controller to perform a device discovery, to search for the target receiver, and to request the target receiver to form the .reception group together with neighboring devices, the neighboring devices being placed adjacent to the target receiver in a reception network,
    wherein the target receiver, and the neighboring' devices form the reception' group.

8. The transmitter of claim 5, wherein the first frequency band is 60 GHz, and the second frequency band is equal to or lower than 5 GHz.

9. A transmission method for extending coverage of a local area wireless communication network, comprising:
    forming a transmission group together with a plurality of peripheral devices, the peripheral devices enabling a local area communication;
    distributing data to the plurality of peripheral devices for transmission to a target receiver; and transmitting the distributed data to the plurality of peripheral devices through a frequency band used for the local area communication, causing each of the plurality of peripheral devices to receive a portion of the distributed data and to transmit the received portion of the distributed data to a reception group, to which the target receiver belongs, and transmitting the distributed data to the reception group, using a cooperative MIMO scheme with the peripheral devices.

10. The transmission method of claim 9, wherein the transmitting of the distributed data to the reception group comprises transmitting the distributed data to the reception group using the frequency band.

11. The transmission method of claim 9, further comprising requesting the target receiver to form the reception group, prior to the forming of the transmission group, wherein the target receiver forms the reception group together with neighboring devices thereof that are placed adjacent to the target receiver.

12. The transmission method of claim 9, wherein the frequency band is 60GHz.

13. A transmission method for extending coverage of a local area wireless communication network, comprising:
   distributing data to a plurality of peripheral devices for transmission to a target receiver, the peripheral devices and the transmitter being in a same sub-network of the local area wireless communication network; and
   transmitting the distributed data to the plurality of peripheral devices through a first frequency band used for a local area communication, causing each of the plurality of peripheral devices to receive a portion of the distributed data and to transmit the distributed data to a reception group, to which the target receiver belongs, through a second frequency band, and transmitting the distributed data to the reception group through the first frequency band or the second frequency band, the second frequency band being used for a wide area communication.

14. The transmission method of claim 13, wherein the transmitting of the distributed data to the reception group comprises changing the first frequency band to the second frequency band and transmitting the distributed data through the second frequency band, when a data rate is equal to or less than a reference value, the data rate being measured when the distributed data is transmitted to the reception group through the first frequency band.

15. The transmission method of claim 13, prior to the distributing of the data, further comprising:
   performing a device discovery, and searching for the target receiver; and
   requesting the target receiver to form the reception group together with neighboring devices, the neighboring devices being placed adjacent to the target receiver in a reception network.

16. The transmission method of claim 13, wherein the first frequency band is 60 GHz, and the second frequency band is equal to or lower than 5 GHz.

17. A receiver for extending coverage of a local area wireless communication network, comprising:
   a communication unit configured to receive portions of data from neighboring devices through a first frequency band and from a source transmitter through a second frequency band, the neighboring devices being placed adjacent to the receiver, the first frequency band being used for a local area communication, and the second frequency band being used for a wide area communication; and
   a decoder to collect the portions of the data received from the source transmitter and the neighboring devices, and to decode the collected portions of data,
   wherein each of the neighboring devices receives a respective portion of the data from transmitters of a transmission group, using a cooperative Multiple-Input Multiple-Output (MIMO) scheme, the transmitters of the transmission group and the source transmitter being in a same sub-network of the local area wireless communication network.

18. The receiver of claim 17, wherein the neighboring devices perform a MIMO detection with respect to the received portions of the data, detect corresponding portions of the data, and transmit the detected portions of the data to the communication unit.

19. The receiver of claim 17, further comprising:
   a group forming unit to form a reception group together with the neighboring devices in response to a request of a source transmitter, or in response to a request of an access point, the source transmitter requesting a data transmission, and the access point being placed in the transmission group.

* * * * *